(12) United States Patent
Lin et al.

(10) Patent No.: US 7,726,966 B2
(45) Date of Patent: Jun. 1, 2010

(54) MOLD UNIT WITH FIRST AND SECOND MODULES

(75) Inventors: Hou-Yao Lin, Taipei Hsien (TW); Sheng-Jung Yu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/327,562

(22) Filed: Dec. 3, 2008

(65) Prior Publication Data

US 2009/0263536 A1  Oct. 22, 2009

(30) Foreign Application Priority Data

Apr. 21, 2008  (CN) .................. 2008 1 0301226

(51) Int. Cl.
*B29C 45/04* (2006.01)
(52) U.S. Cl. .................. 425/572; 425/577; 425/588; 425/589
(58) Field of Classification Search .................. 425/190, 425/572, 577, 588, 589
See application file for complete search history.

(56) References Cited

U.S. PATENT DOCUMENTS

| | | | | |
|---|---|---|---|---|
| 3,417,433 A | * | 12/1968 | Teraoka | 425/559 |
| 3,707,342 A | * | 12/1972 | Lohmann | 425/570 |
| 3,880,560 A | * | 4/1975 | Takahashi | 425/130 |
| 4,753,592 A | * | 6/1988 | Kaaden | 425/547 |
| 5,052,915 A | * | 10/1991 | Schad et al. | 425/556 |
| 5,145,355 A | * | 9/1992 | Poinsot et al. | 431/1 |
| 5,773,049 A | * | 6/1998 | Kashiwa et al. | 425/572 |
| 6,036,471 A | * | 3/2000 | McKinney | 425/542 |
| 2004/0180108 A1 | * | 9/2004 | Wobbe et al. | 425/589 |
| 2006/0244178 A1 | * | 11/2006 | Armbruster | 264/255 |

* cited by examiner

*Primary Examiner*—Yogendra N Gupta
*Assistant Examiner*—Emmanuel S Luk
(74) *Attorney, Agent, or Firm*—Clifford O. Chi

(57) ABSTRACT

An exemplary mold unit includes a first mold module and a second mold module adjacent to the first mold module. Each of the first mold module and the second mold module includes a fixed mold and a movable mold capable of moving toward and away from the fixed mold. The fixed and movable molds are configured to form a plurality of shaping chambers therebetween when the fixed and movable molds are in a closed position. The fixed mold defines a main runner having an inner end capable of communicating with the shaping chambers for supplying molten material into the shaping chambers.

12 Claims, 2 Drawing Sheets

MOLD UNIT WITH FIRST AND SECOND MODULES

BACKGROUND

1. Technical Field

The disclosure relates to molding apparatus, and particularly to an injection molding apparatus.

2. Description of Related Art

Many kinds of workpieces are made via molds. Molds are widely used in many industry fields, such as electronic components, automobiles, motors, and communication devices. A typical mold unit includes a movable first mold and a fixed second mold. The second mold has a main runner. The first mold has a shaping chamber and a pushing mechanism. Molten plastic material is injected into the shaping chamber of the first mold through the main runner of the second mold. After the molten plastic material is cooled, the pushing mechanism pushes the cooled plastic material off from the shaping chamber to obtain the workpiece. However, the production capability of such mold unit may be rather low.

Therefore, there is a room for improvement within the art.

SUMMARY

An exemplary mold unit includes a first mold module and a second mold module adjacent to the first mold module. Each of the first mold module and the second mold module includes a fixed mold and a movable mold capable of moving toward and away from the fixed mold. The fixed and movable molds are configured to form a plurality of shaping chambers therebetween when the fixed and movable molds are in a closed position. The fixed mold defines a main runner having an inner end capable of communicating with the shaping chambers for supplying molten material into the shaping chambers.

Other advantages and novel features will become more apparent from the following detailed description of embodiments when taken in conjunction with the accompanying drawings.

DETAILED DESCRIPTION

Figure 1:
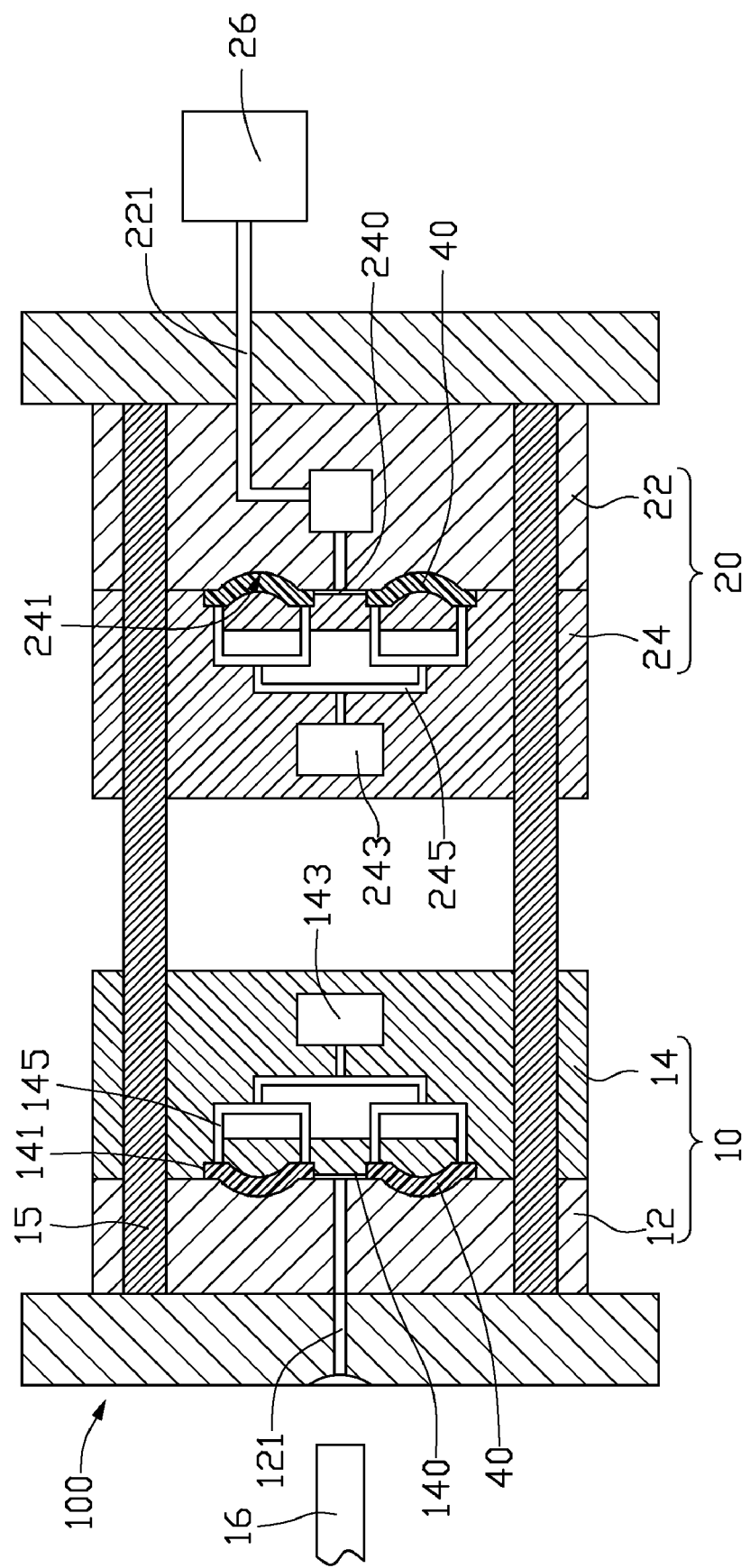
FIG. 1 is a cross-sectional view of a mold unit according to an exemplary embodiment of the present invention, showing the mold unit in a closed position.

Referring to FIG. 1, a mold unit 100 according to an exemplary embodiment includes a first mold module 10 and a second mold module 20 adjacent to the first mold module 10.

The first mold module 10 includes a fixed mold 12 and a movable mold 14. Two parallel guiding means 15 each extend through the fixed mold 12 and the movable mold 14. In the illustrated embodiment, the guiding means 15 include guide rods. The movable mold 14 can move toward or away from the fixed mold 12 by sliding along the guiding means 15. The fixed mold 12 defines a main runner 121 in the middle thereof. A plurality of branching runners 140 and shaping chambers 141 are formed between the fixed mold 12 and the movable mold 14 when the first mold module 10 is in a closed position, i.e., when the movable mold 14 abuts against the fixed mold 12.

An inner end of the main runner 121 communicates with the branching runners 140. An outer end of the main runner 121 communicates with a feed stock pipe 16 of an injection molding machine (not shown). Thus, molten material can be injected from the feed stock pipe 16 into the shaping chambers 141 via the main runner 121 and the branching runners 140 to form workpieces 40 in the shaping chambers 141. An electronic control motor 143 and a pushing mechanism 145 are incorporated into the movable mold 14, with the pushing mechanism 145 being adjacent to the shaping chambers 141. The pushing mechanism 145 abuts the workpieces 40 formed in the shaping chambers 141. The motor 143 is used to drive the pushing mechanism 145 to push the formed workpieces 40 off from the movable mold 14. That is, the pushing mechanism 145 separates the formed workpieces 40 from the movable mold 14.

The second mold module 20 has a similar configuration to the first mold module 10. The second mold module 20 includes a fixed mold 22 and a movable mold 24. The two parallel guiding means 15 each extend through the fixed mold 22 and the movable mold 24 so that the first and second mold modules 10, 20 share the same guiding means 15. The fixed molds 12, 22 are respectively located at two opposite ends of the mold unit 100, and the movable molds 14, 24 are located in a middle position of the mold unit 100, so that the first and second mold modules 10, 20 are arranged symmetrically opposite each other. The movable mold 24 can move toward or away from the fixed mold 22 by sliding along the guiding means 15.

The fixed mold 22 defines a main runner 221 in a middle portion thereof. A plurality of branching runners 240 and shaping chambers 241 are formed between the fixed mold 22 and the movable mold 24 when the second mold module 20 is in a closed position. The branching runners 240 communicate with the shaping chambers 241. An inner end of the main runner 221 communicates with the branching runners 240. An electronic control motor 243 and a pushing mechanism 245 are incorporated into the movable mold 24, with the pushing mechanism 245 being adjacent to the shaping chambers 241. The motor 243 is used to drive the pushing mechanism 245 to push formed workpieces 40 off from the movable mold 24.

The difference between the second mold module 20 and the first mold module 10 is that an outer end of the main runner 221 communicates with a feed stock pipe of a measuring instrument 26. A predetermined amount of molten material controlled by the measuring instrument 26 is injected into the shaping chambers 241 via the main runner 221 and the branching runners 240 to form the workpieces 40 in the shaping chambers 241.

Figure 2:
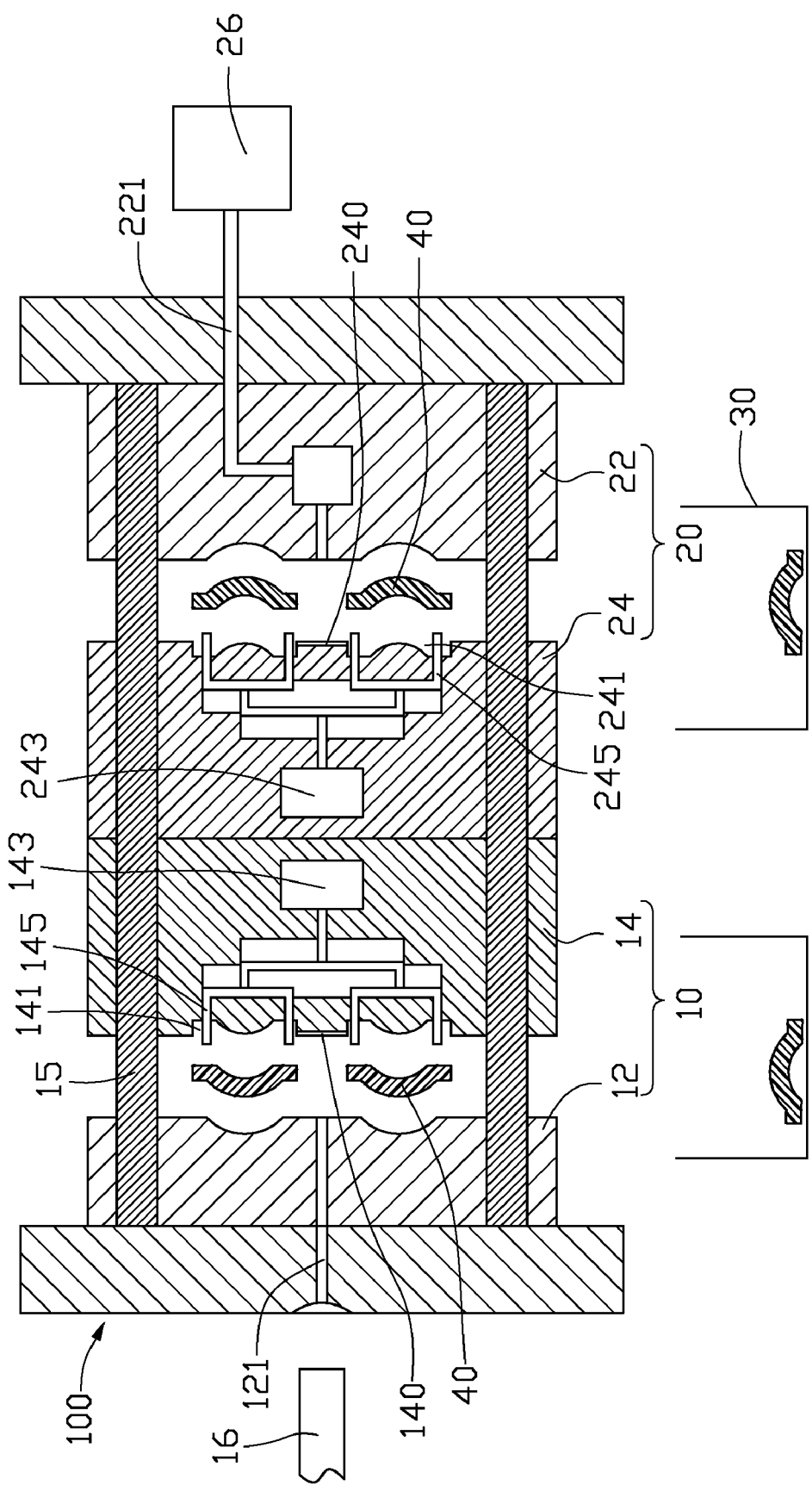
FIG. 2 is similar to FIG. 1, but showing the mold unit in an open position.

The first and second mold modules 10, 20 are capable of operating simultaneously. Referring also to FIG. 2, when the mold unit 100 is opened, the movable molds 14, 24 move away to separate from the fixed molds 12, 22, respectively. The pushing mechanisms 145, 245 are then driven by the motors 143, 243 to push the formed workpieces 40 off from the movable molds 141, 241, respectively. Then the workpieces 40 fall into gathering boxes 30 below the mold unit 100. Alternatively, the formed workpieces 40 can be removed by a robotic arm after the mold unit 100 is opened. In another alternative embodiment, the formed workpieces 40 are connected together and are subsequently cut into separate workpieces 40.

Compared with a typical mold unit, the mold unit 100 has certain advantages. For example, the first mold module 10 and the second mold module 20 can be used to make the workpieces 40 at the same time, so that production of the workpieces 40 is enhanced greatly. Furthermore, by selectively using either or both of the mold modules 10, 20, the production of the workpieces 40 can be flexibly increased or decreased according to actual need. Moreover, if one of the mold modules 10, 20 is damaged and unusable, the other one can still be used to maintain production.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mold unit, comprising:
   a first mold module;
   a second mold module adjacent to the first mold module, each of the first mold module and the second mold module comprising:
      a fixed mold and a movable mold capable of moving toward and away from the fixed mold, the fixed and movable molds configured to form a plurality of shaping chambers therebetween when the fixed and movable molds are in a closed position, the fixed mold defining a main runner having an inner end capable of communicating with the shaping chambers for supplying molten material into the shaping chambers; and
   two parallel guiding structures each extending through both the first mold module and the second mold module, the fixed molds respectively located at two opposite ends of the mold unit and the movable molds located in a middle of the mold unit such that the first and second mold modules are arranged symmetrically opposite each other, the movable molds of the first and second mold modules capable of moving toward or away from the fixed molds of the first and second mold modules by sliding along the guiding structures.

2. The mold unit of claim 1, wherein the movable mold comprises a motor and a pushing mechanism, the pushing mechanism being adjacent to the shaping chambers when the fixed and movable molds are in a closed position, the motor being adapted for driving the pushing mechanism to push workpieces formed in the shaping chambers off from the movable mold.

3. The mold unit of claim 1, wherein an outer end of the main runner of the first mold module or the second mold module is connected with a feed stock pipe.

4. The mold unit of claim 3, wherein an outer end of the main runner of the first mold module is connected with a feed stock pipe of an injection molding machine, and an outer end of the main runner of the second mold module is connected with a feed stock pipe of a measuring instrument.

5. The mold unit of claim 2, wherein the motor is an electronic control motor.

6. The mold unit of claim 1, wherein the first and second mold modules are capable of operating simultaneously.

7. A mold unit, comprising:
   a first mold module;
   a second mold module adjacent to the first mold module; and
   two parallel guiding structures each extending through both the first mold module and the second mold module;
   each of the first mold module and the second mold module comprising a fixed mold and a movable mold capable of moving toward and away from the fixed mold via the guiding structures, the fixed and movable molds configured to cooperatively form at least one shaping chamber when the fixed and movable molds are in a closed position, the fixed mold defining a main runner having an inner end capable of communicating with the at least one shaping chamber for supplying molten material into the at least one shaping chamber, the fixed molds respectively located at two opposite ends of the mold unit, and the movable molds located in a middle position of the mold unit such that the first and second mold modules are arranged symmetrically opposite each other, the movable molds of the first and second mold modules being capable of moving toward or away from the fixed molds of the first and second mold modules by sliding along the guiding structures.

8. The mold unit of claim 7, wherein the movable mold comprises a motor and a pushing mechanism, the pushing mechanism being adjacent to the at least one shaping chamber when the fixed and movable molds are in a closed position, the motor being adapted for driving the pushing mechanism to push at least one workpiece formed in the at least one shaping chamber off from the movable mold.

9. The mold unit of claim 7, wherein an outer end of the main runner of the first mold module or the second mold module is connected with a feed stock pipe.

10. The mold unit of claim 9, wherein an outer end of the main runner of the first mold module is connected with a feed stock pipe of an injection molding machine, and an outer end of the main runner of the second mold module is connected with a feed stock pipe of a measuring instrument.

11. The mold unit of claim 8, wherein the motor is an electronic control motor.

12. The mold unit of claim 7, wherein the first and second mold modules are capable of operating simultaneously.

\* \* \* \* \*